(12) United States Patent
Go et al.

(10) Patent No.: US 9,568,948 B2
(45) Date of Patent: Feb. 14, 2017

(54) DISPLAY DEVICE AND METHOD OF MANUFACTURING THE SAME

(71) Applicant: SAMSUNG DISPLAY CO., LTD., Yongin, Gyeonggi-Do (KR)

(72) Inventors: Heung Seok Go, Yongin (KR); In Nam Lee, Seoul (KR); Choon Hyop Lee, Suwon-si (KR); Suk Choi, Gyeonggi-Do (KR); Young Kuil Joo, Chungcheongnam-do (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 72 days.

(21) Appl. No.: 14/302,019

(22) Filed: Jun. 11, 2014

(65) Prior Publication Data
US 2015/0062028 A1 Mar. 5, 2015

(30) Foreign Application Priority Data

Aug. 28, 2013 (KR) ........................ 10-2013-0102489

(51) Int. Cl.
*G06F 3/041* (2006.01)
*G06F 1/16* (2006.01)
*G06F 3/044* (2006.01)

(52) U.S. Cl.
CPC ........... *G06F 1/1616* (2013.01); *G06F 1/1652* (2013.01); *G06F 3/044* (2013.01); *G06F 2203/04102* (2013.01)

(58) Field of Classification Search
CPC ...... G06F 1/1616; G06F 1/1652; G06F 3/044; G06F 2203/04102; G06F 2203/04103; G02F 1/133; G02F 1/1333; G02F 1/13305; G02F 1/13336; G02F 1/13338; G02F 2001/13324; G02F 2001/13391
See application file for complete search history.

(56) References Cited

U.S. PATENT DOCUMENTS 8,654,095 B1 * 2/2014 Cho ...................... G06F 1/1652
345/173
2006/0034042 A1 * 2/2006 Hisano .................. G06F 1/1616
361/679.04
(Continued)

FOREIGN PATENT DOCUMENTS

| KR | 10-2011-0093735 A | 8/2011 |
| KR | 10-2013-0030395 A | 3/2013 |
| KR | 10-2013-0038836 | 4/2013 |

OTHER PUBLICATIONS

Gong et al. Metal-Graphene-Metal Sandwich Contacts, etc. ACSNANO, vol. 6, No. 6, 5381-5387, 2012.

*Primary Examiner* — Jonathan Boyd
*Assistant Examiner* — Sardis F Azongha
(74) *Attorney, Agent, or Firm* — Lee & Morse, P.C.

(57) ABSTRACT

A display device includes a touch screen panel folded based on a folding axis, and at least one touch electrode on the folding axis. Each of the touch electrodes on the folding axis may include a graphene layer, a metal mesh layer, and an adhesion metal mesh layer. The grapheme layer may be along the folding axis on a transparent substrate. The first metal mesh layer may be on the transparent substrate to adhere to a lateral surface of the first graphene layer. The first adhesion metal mesh layer may be on a boundary portion between the first graphene layer and the first metal mesh layer.

20 Claims, 23 Drawing Sheets

(56) References Cited

U.S. PATENT DOCUMENTS

| | | | |
|---|---|---|---|
| 2009/0219257 A1 | 9/2009 | Frey et al. | |
| 2010/0182265 A1* | 7/2010 | Kim | G06F 1/1616 345/173 |
| 2011/0210937 A1* | 9/2011 | Kee | G06F 3/041 345/174 |
| 2012/0235894 A1* | 9/2012 | Phillips | G09G 3/36 345/156 |
| 2012/0262367 A1* | 10/2012 | Chiu | G06F 1/1626 345/156 |
| 2013/0048339 A1 | 2/2013 | Tour et al. | |
| 2013/0120239 A1* | 5/2013 | Suzuki | G06F 1/1643 345/156 |
| 2013/0265221 A1* | 10/2013 | Lee | G06F 3/01 345/156 |
| 2013/0265257 A1* | 10/2013 | Jung | G06F 3/0412 345/173 |

\* cited by examiner

DISPLAY DEVICE AND METHOD OF MANUFACTURING THE SAME

CROSS-REFERENCE TO RELATED APPLICATION

The present application claims priority under 35 U.S.C. §119 to Korean Patent Application No. 10-2013-0102489, filed on Aug. 28, 2013, in the Korean Intellectual Property Office, and entitled: "Display Device and Method Of Manufacturing The Same," which is incorporated by reference herein in its entirety.

BACKGROUND

1. Field

Embodiments of the present disclosure relate to a display device and a method of manufacturing the same, and more particularly, to a foldable display device and a method of manufacturing the same.

2. Description of the Related Art

A foldable display device may have bending and folding characteristics. The foldable display device has merits in that the foldable display device is easy to carry and a large-scaled screen can be implemented. The foldable display device may be applied to mobile equipment such as a mobile phone, a portable multimedia player (PMP), a navigation device, an ultra-mobile PC (UMPC), an electronic book, and an electronic newspaper, as well as use in various contexts such as a television and a monitor.

SUMMARY

An exemplary embodiment of the present disclosure provides a display device. The display device may include a touch screen panel folded based on a folding axis, in which the touch screen panel includes at least one first touch electrode on the folding axis. Each of the at least one first touch electrode on the folding axis may include a first graphene layer, a first metal mesh layer, and a first adhesion metal mesh layer. The first grapheme layer may be along the folding axis on a transparent substrate. The first metal mesh layer may be on the transparent substrate to adhere to a lateral surface of the first graphene layer. The first adhesion metal mesh layer may be on a boundary portion between the first graphene layer and the first metal mesh layer.

The touch screen panel may further include a plurality of first touch electrodes not disposed on the folding axis, and each of the plurality of first touch electrodes not on the folding axis may be formed of the first metal mesh layer. The first metal mesh layer may include any one of copper (Cu), aluminum (Al), molybdenum (Mo), and silver (Ag). The first adhesion metal mesh layer may include any one of copper (Cu), aluminum (Al), molybdenum (Mo), and silver (Ag). The touch screen panel may further include a refractive index matching layer on the first graphene layer and the first adhesion metal mesh layer. Each of at least one touch electrode may further include a transparent conductive layer disposed on the transparent substrate, and the first graphene layer and the first metal mesh layer may be on the transparent conductive layer. The touch screen panel may further include an insulating layer on the first metal mesh layer, the first graphene layer, and the first adhesion metal mesh layer.

The touch screen panel may further include at least one second touch electrode on the folding axis, and each of the at least one second touch electrodes on the folding axis may include a second graphene layer disposed along the folding axis on the insulating layer. Each the of at least one second touch electrodes on the folding axis may further include a second metal mesh layer on the insulating layer to adhere to a lateral surface of the second graphene layer, and a second adhesion metal mesh layer on a boundary portion between the second graphene layer and the second metal mesh layer. The touch screen panel may further include a plurality of second touch electrodes not on the folding axis, and each of the plurality of second touch electrodes not on the folding axis may be formed of the second metal mesh layer. The second metal mesh layer may include any one of copper (Cu), aluminum (Al), molybdenum (Mo), and silver (Ag). The second adhesion metal mesh layer may include any one of copper (Cu), aluminum (Al), molybdenum (Mo), and silver (Ag). The touch screen panel may further include a refractive index matching layer on the second graphene layer and the second adhesion metal mesh layer.

Another exemplary embodiment of the present disclosure provides a method of manufacturing a display device including a touch screen panel folded based on a folding axis. A first metal mesh layer may be disposed on a transparent substrate. A first graphene layer may be disposed in a region corresponding to the folding axis on the transparent substrate. A first adhesion metal mesh layer may be disposed on a boundary portion between the first graphene layer and the first metal mesh layer. The disposing of the first metal mesh layer on the transparent substrate may include disposing the first metal mesh layer included in at least one first touch electrode disposed on the folding axis, and disposing a plurality of first touch electrodes not disposed on the folding axis by the first metal mesh layer.

The method may further include disposing a refractive index matching layer on the first graphene layer and the first adhesion metal mesh layer. The method may further include disposing an insulating layer on the first metal mesh layer, the first graphene layer, and the first adhesion metal mesh layer. The disposing of a second metal mesh layer on the insulating layer may further include disposing a second graphene layer in a region corresponding to the folding axis on the insulating layer, and disposing a second adhesion metal mesh layer on a boundary portion between the second graphene layer and the second metal mesh layer. The method may further include disposing a refractive index matching layer on the second graphene layer and the second adhesion metal mesh layer. The disposing of the second metal mesh layer on the insulating layer may include disposing a second metal mesh layer included in at least one second touch electrode disposed on the folding axis, and disposing a plurality of second touch electrodes not disposed on the folding axis by the second metal mesh layer.

BRIEF DESCRIPTION OF THE DRAWINGS

Features will become apparent to those of ordinary skill in the art by describing in detail exemplary embodiments with reference to the attached drawings in which.

DETAILED DESCRIPTION

Figure 1:
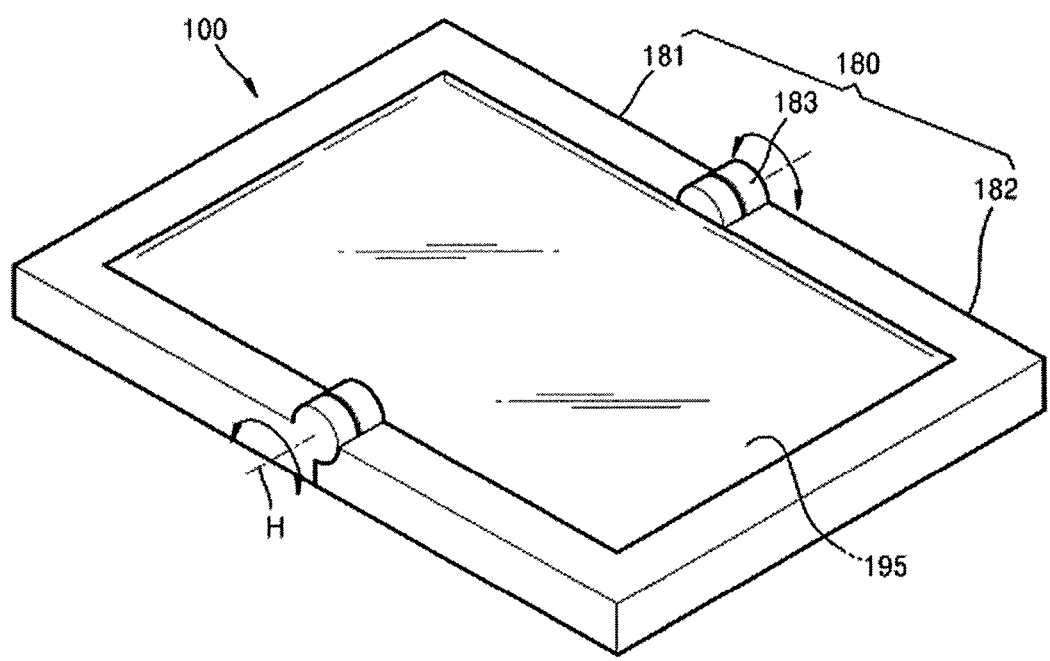
FIG. 1 illustrates an appearance of a foldable display device according to an exemplary embodiment of the present disclosure.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the following detailed description, only certain exemplary embodiments of the present disclosure have been shown and described, simply by way of illustration. As those skilled in the art would realize, the described embodiments may be modified in various different ways, all without departing from the spirit or scope of the present disclosure.

Further, in exemplary embodiments, because like reference numerals designate like elements having the same configuration, a first exemplary embodiment is representatively described, and in other exemplary embodiments, only a configuration different from the first exemplary embodiment will be described. Accordingly, the drawings and description are to be regarded as illustrative in nature and not restrictive.

Figure 2:
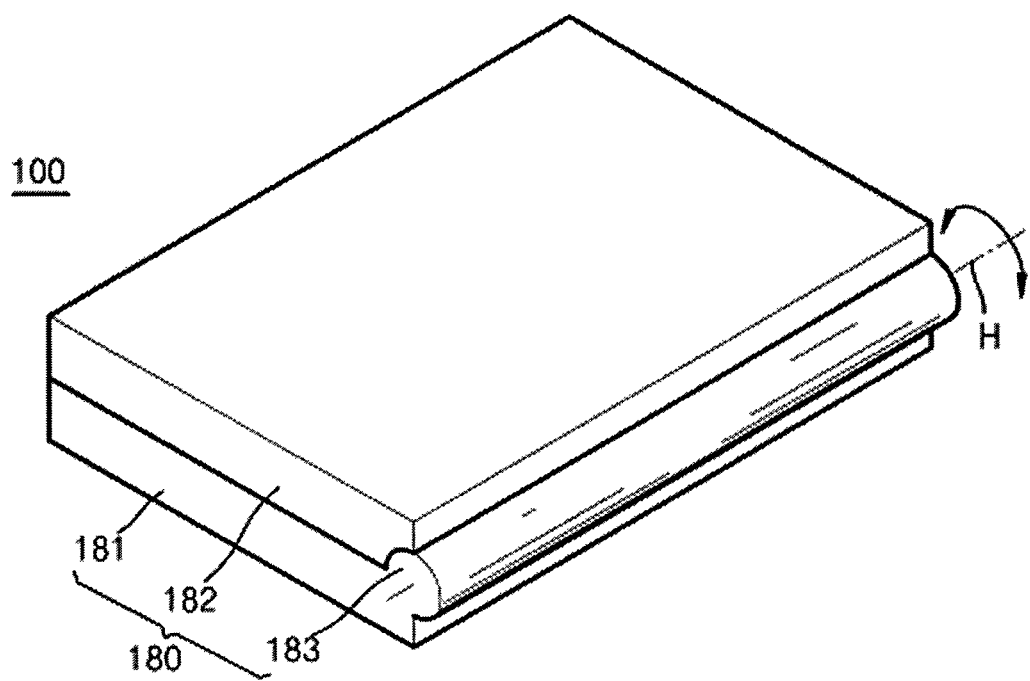
FIG. 2 illustrates a folding state of the foldable display device of FIG. 1.

FIG. 1 illustrates an appearance of a foldable display device according to an exemplary embodiment of the present disclosure. FIG. 2 illustrates a folding state of the foldable display device of FIG. 1. Referring to FIGS. 1 and 2, an appearance of a foldable display device 100 illustrated herein is one exemplary embodiment. The appearance of the foldable display device 100 may be variously modified. The appearance of the foldable display device 100 includes a body 180 having a first portion 181, a second portion 182, and a hinge portion 183 connecting the first portion 181 and the second portion 182. The center of the hinge portion 183 becomes a folding axis H when the foldable display device 100 is folded. According to the purpose of the foldable display device 100, an optical film 195 may be further attached to an upper portion of a screen of the display device in order to improve performance. For example, at least one of a polarization film, an antireflection film, and an antiglare film as the optical film 195 may be attached to the upper portion of the screen.

Figure 3:
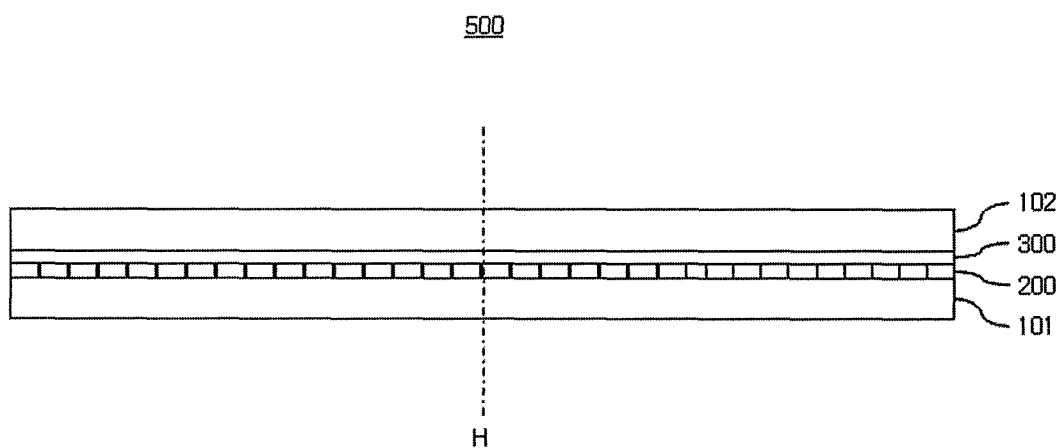
FIG. 3 illustrates a schematic cross-sectional view of the foldable display device according to an exemplary embodiment of the present disclosure.

A panel portion 500 like FIG. 3 may be installed in an inside of the body 180. The panel portion 500 is described with reference to FIG. 3. Hereinafter, the first portion 181, the second portion 182, and the hinge portion 183 of the body 180 of the foldable display device 100 having already been described above, the constitution of the panel portion 500 is described with particular focus. In addition, for the convenience of description, in the following top plan view, the folding axis H is represented in a horizontal direction, and in the cross-sectional view, the folding axis H is represented in a vertical direction to describe a position at which the panel portion 500 or a touch screen panel 300 is folded, and means one folding axis H.

FIG. 3 illustrates a schematic cross-sectional view of the foldable display device according to an exemplary embodiment of the present disclosure. Referring to FIG. 3, the panel portion 500 when the foldable display device 100 is unfolded is illustrated. The panel portion 500 included in the foldable display device 100 includes a first protective window 101, a display panel 200 on the first protective window 101, the touch screen panel 300 on the display panel 200, and a second protective window 102 disposed on the touch screen panel 300.

The first protective window 101 and the second protective window 102 may include a polymer material that is flexible and is capable of being elastically restored as a transparent material. For example, the first protective window 101 and the second protective window 102 may include any one material of PMMA (polymethyl methacrylate), PDMS (polydimethylsiloxane), a transparent silicon resin, and Teflon.

A plurality of display diodes is included in the display panel 200. The plurality of display diodes may be any one of display diodes such as an organic light emitting diode (OLED) display, a liquid crystal display (LCD), a field emission display (FED), and a plasma display panel (PDP). That is, the display panel 200 may be any one display panel of the organic light emitting diode display, the liquid crystal display, the field emission display, and the plasma display panel. The touch screen panel 300 may adhere onto the display panel 200 by an adhesive. The touch screen panel 300 included in the foldable display device 100 is described herein.

Figure 4:
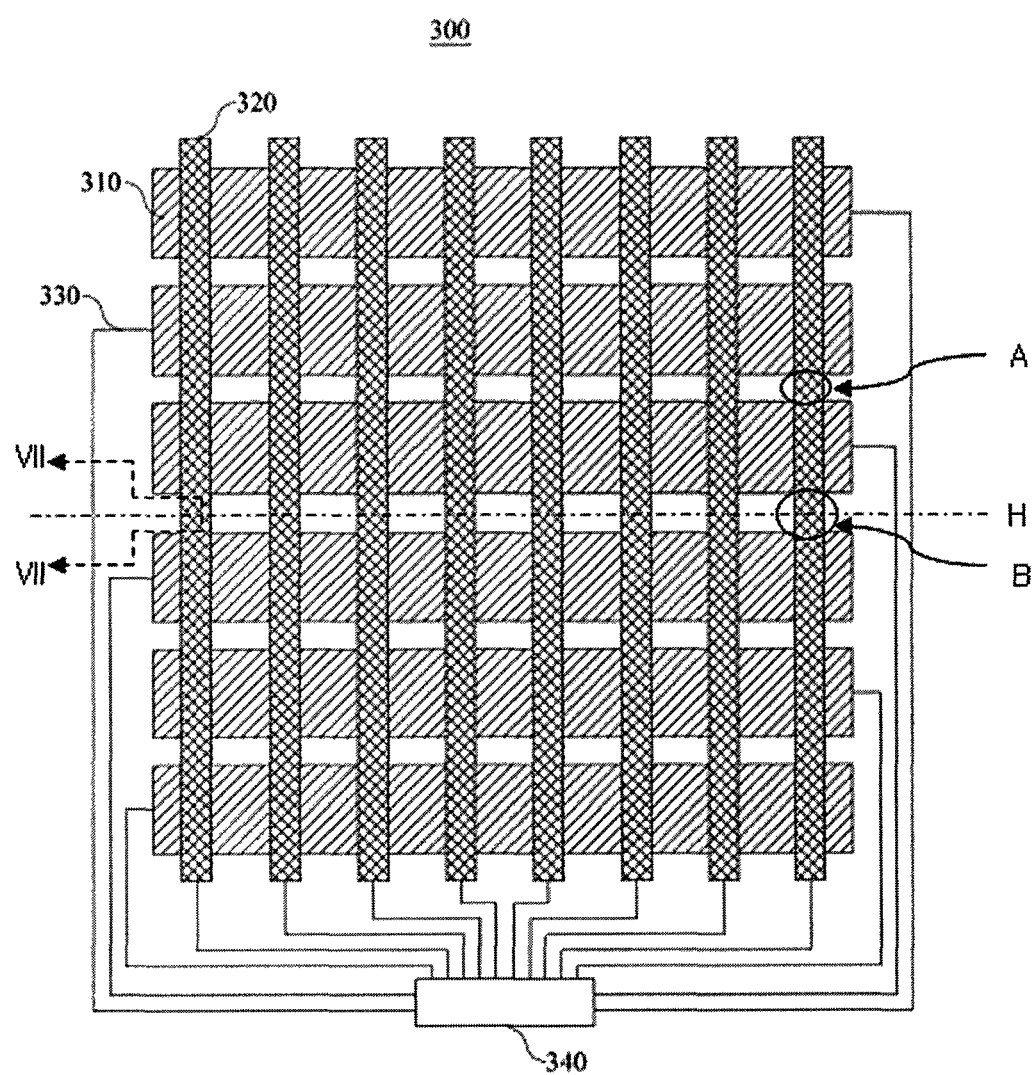
FIG. 4 illustrates a schematic top plan view of a touch screen panel included in the foldable display device according to an exemplary embodiment of the present disclosure.
Figure 5:
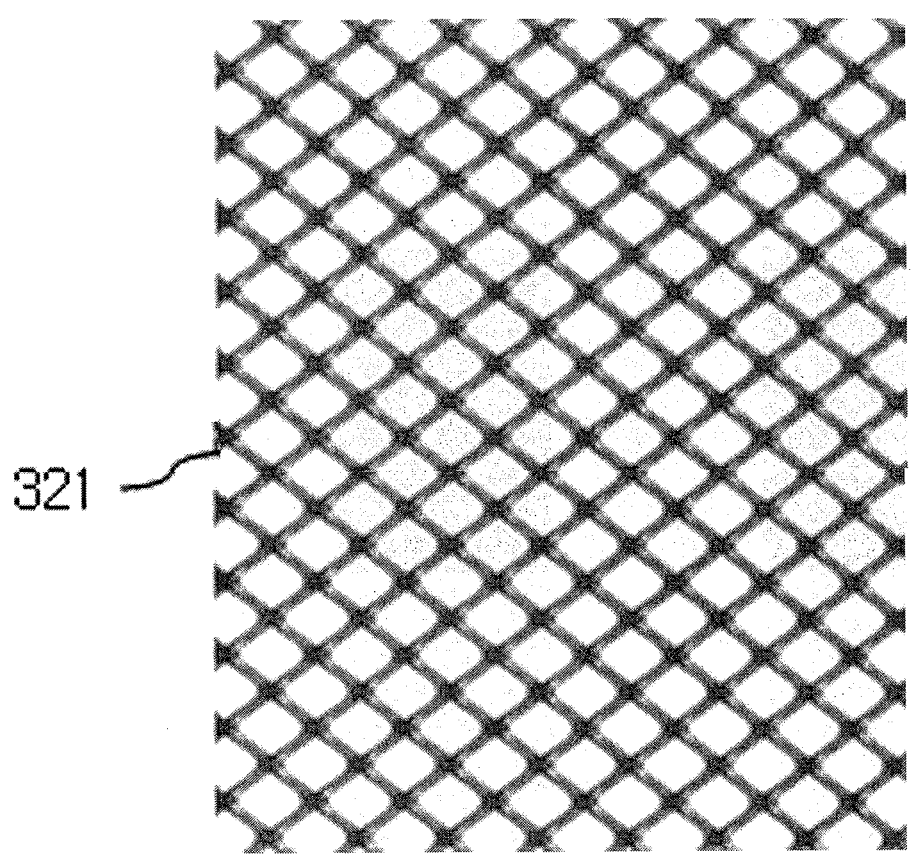
FIG. 5 illustrates an example view of a shape of a touch electrode of the touch screen panel according to an exemplary embodiment of the present disclosure.
Figure 6:
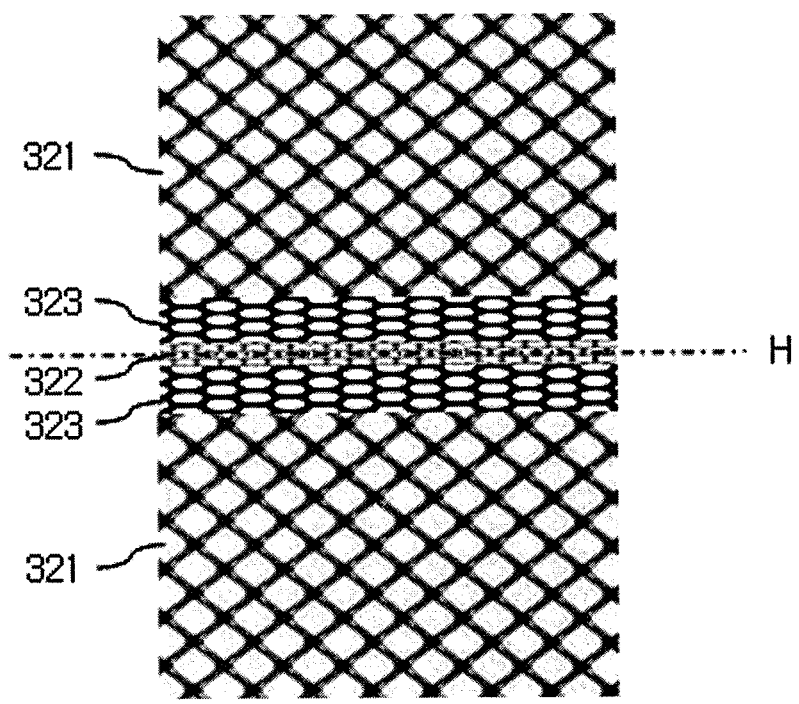
FIG. 6 illustrates an example view of the shape of the touch electrode in a folding portion of the touch screen panel according to an exemplary embodiment of the present disclosure.
Figure 7:
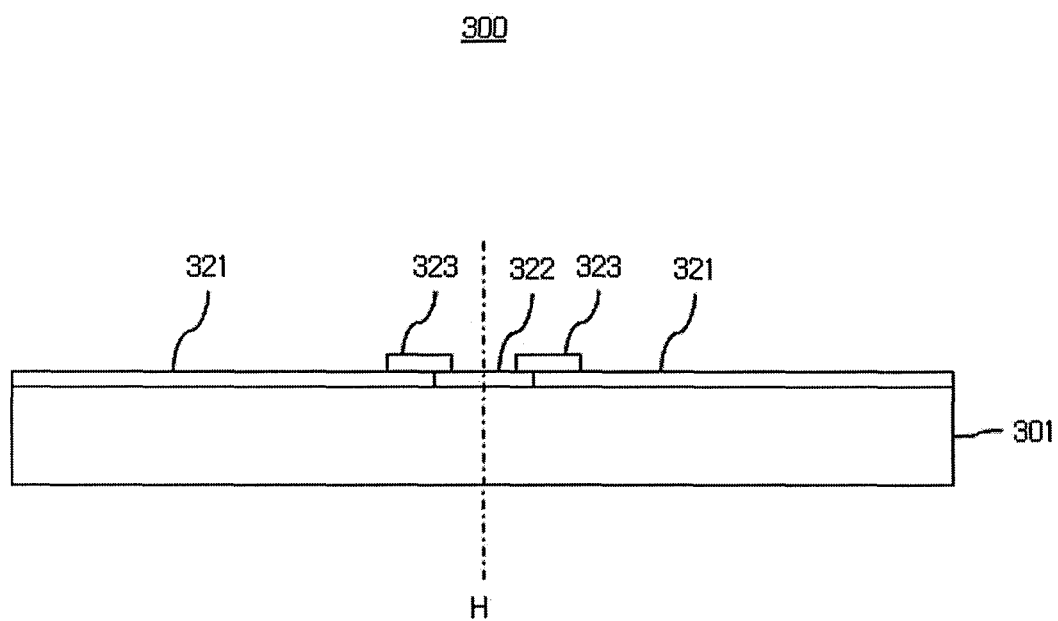
FIG. 7 illustrates a cross-sectional view of a cross-section of the touch electrode, which is taken along line VII-VII, in the folding portion of the touch screen panel of FIG. 4.

FIG. 4 illustrates a schematic top plan view of the touch screen panel included in the foldable display device according to an exemplary embodiment of the present disclosure. FIG. 5 illustrates an example view illustrating a shape of a touch electrode of the touch screen panel according to an exemplary embodiment of the present disclosure. FIG. 6 illustrates an example view illustrating the shape of the touch electrode in the folding portion of the touch screen panel according to an exemplary embodiment of the present disclosure. FIG. 7 illustrates a cross-sectional view illustrating a cross-section of the touch electrode, which is taken along line VII-VII, in the folding portion of the touch screen panel of FIG. 4.

Referring to FIGS. 4 to 7, the touch screen panel 300 includes a plurality of touch electrodes 310 and 320 and a sensing circuit portion 340 on a transparent substrate 301. The plurality of touch electrodes 310 and 320 are connected to the sensing circuit portion 340 through a sensing wire 330 on the transparent substrate 301. The plurality of touch electrodes 310 and 320 include a plurality of driving electrodes 310 to which a touch detection signal is applied, and a plurality of sensing electrodes 320 for detecting a touch position. The plurality of driving electrodes 310 may be formed in a first direction, and the plurality of sensing electrodes 320 may be formed in a second direction that is vertical to the first direction.

An insulating layer is interposed between the plurality of driving electrodes 310 and the plurality of sensing electrodes 320 to separate the plurality of driving electrodes 310 and the plurality of sensing electrodes 320. By separating the plurality of driving electrodes 310 and the plurality of sensing electrodes 320 by the insulating layer, a capacitance may be formed between the driving electrode 310 and the sensing electrode 320, and the sensing circuit portion 340 may sense a change in capacitance to detect the touch position.

The folding axis H may be in the first direction crossing the plurality of sensing electrodes 320. In this case, the sensing electrode (e.g., the sensing electrode of portion A) not on the folding axis H, as illustrated in FIG. 4, may be formed of a metal mesh layer 321. The metal mesh layer may be manufactured by finely patterning metal having high conductivity. The metal mesh layer 321 may be manufactured by a printing manner, an imprinting manner, a lithography manner, or the like. The printing manner is a manner where a transparent electrode (or wire) is directly formed of a transparent conductive material (or metal material) on the substrate by using a gravure or offset manner. The imprinting manner is a manner where after a fine pattern is disposed on a transparent conductive layer or a metal layer, the transparent conductive layer (or metal layer) is etched through the fine pattern to form the transparent electrode (or wire). The lithography manner is a manner where the fine pattern is disposed on the substrate through a source such as light, a laser, or an electronic beam, and the transparent conductive layer (or metal layer) may be etched by using the fine pattern to form the transparent electrode (or wire).

A plurality of metal patterns forming the metal mesh layer 321 may include a metal material such as copper (Cu), aluminum (Al), molybdenum (Mo), and/or silver (Ag) to have a line width of about 0.1 μm to about 10 μm. The plurality of sensing electrodes 320 formed on the metal mesh layer 321 has high conductivity and high transparency. The plurality of driving electrodes 310 not on the folding axis H may be formed of the metal mesh layer 321. The plurality of driving electrodes 310 formed on the metal mesh layer 321 may have high conductivity and high transparency.

The sensing electrode (e.g., the sensing electrode of portion B) on the folding axis H, as illustrated in FIGS. 5 and 6, includes a graphene layer 322 formed along the folding axis H on the transparent substrate 301, the metal mesh layer 321 adhering to a lateral surface of the graphene layer 322, and an adhesion metal mesh layer 323 on a boundary portion between the graphene layer 322 and the metal mesh layer 321. The transparent substrate 301 may be formed of a transparent polymer compound such as PET (polyethylene terephthalate) and PC (polycarbonate).

The graphene layer 322 may be formed of one or more graphene mono-layered structures. Graphene is a hexagonal system mono-layered structure formed of carbon atoms. Graphene is chemically very stable, and has a semi-metal characteristic where a conduction band and a valance band overlap at only one point (i.e., Dirac point). Further, graphene has a two-dimensional ballistic transport characteristic. The two-dimensional ballistic transport of electric charges in a material means transport in a state where there is scarcely resistance by scattering. Accordingly, mobility of the electric charges in graphene is very high. Besides, graphene has a current density (about 108 A/cm2) that is higher than that of copper by about 100 times or more. In addition, graphene of one layer has transmittance of 97.9%, thus having high transparency. Further, graphene has high elastic restoring force as compared to another metal material. For example, the elastic restoring force of Si is within about 0.7%, the elastic restoring force of ITO is about 0.58 to about 1.15%, the elastic restoring force of Au is about 0.46%, the elastic restoring force of poly-ZnO is about 0.03%, and the elastic restoring force of polyimide is about 4%, but elastic restoring force of graphene is 15% or more.

The graphene layer 322 may be formed by various methods such as thermal chemical vapor deposition (CVD), plasma enhanced-CVD (PE-CVD), and/or molecular beam epitaxy (MBE). In the case where the thermal CVD method is used, the graphene layer 322 may be formed by injecting hydrocarbon gases such as $CH_4$, $C_2H_4$, or $C_2H_2$ or vapors of benzene ($C_6H_6$) that is in a liquid form into a deposition chamber at a high temperature of about 700° C. or more. In the case where the PE-CVD method is used, the graphene layer 322 may be formed at a temperature that is lower than that of the thermal CVD method by using the same reaction gas as the gas used in the thermal CVD method. In this case, various sources such as DC (direct current) power, RF (radio frequency) power, and microwave power may be used in order to form a plasma. In the case where the MBE method is used, the graphene layer 322 may be formed by maintaining a substrate temperature at about 600° C. to about 1000° C. under a ultra-high vacuum (UHV) condition, and forming a carbon flux in the deposition chamber by using an electron beam (E-beam) or the like.

The metal mesh layer 321 may be on the transparent substrate 301 to adhere to the lateral surface of the graphene layer 322. The metal mesh layer 321 adhering to the lateral surface of the graphene layer 322 may be formed together when the metal mesh layer 321 forming the sensing electrode not on the folding axis H is formed. That is, the metal mesh layer 321 forming the sensing electrode not disposed on the folding axis H and the metal mesh layer 321 adhering to the lateral surface of the graphene layer 322 may include the same material.

The adhesion metal mesh layer 323 is disposed on the boundary portion between the graphene layer 322 and the metal mesh layer 321. The adhesion metal mesh layer 323 may be manufactured by the printing manner, the imprinting manner, the lithography manner, or the like. The adhesion metal mesh layer 323 may include the metal material such as copper (Cu), aluminum (Al), molybdenum (Mo), and/or silver (Ag). The adhesion metal mesh layer 323 may include the same material as the metal mesh layer 321.

Contact resistance by adhesion of the metal mesh layer 321 and the graphene layer 322 may be increased. Contact resistance between the metal mesh layer 321 and the graphene layer 322 may be reduced and adhesion strength between the metal mesh layer 321 and the graphene layer 322 may be increased by forming the adhesion metal mesh layer 323 on the boundary portion between the graphene layer 322 and the metal mesh layer 321. In the case where the metal mesh layer 321 and the adhesion metal mesh layer 323 include copper (Cu), for example, adhesion strength of the metal mesh layer 321, the adhesion metal mesh layer 323, and the graphene layer 322 may be further improved due to a characteristic of copper (Cu) well adsorbing carbon (C). The metal mesh layer 321, the graphene layer 322, and the adhesion metal mesh layer 323 may have a thickness of about several to several tens of nanometers. As described herein, in the foldable display device 100, the folding portion in at least one sensing electrode 320 on the folding axis H is formed of the graphene layer 322 such that the folding portion has high light transmittance and high electric conductivity and becomes strong and resistant to cracking and other damage.

Figure 8:
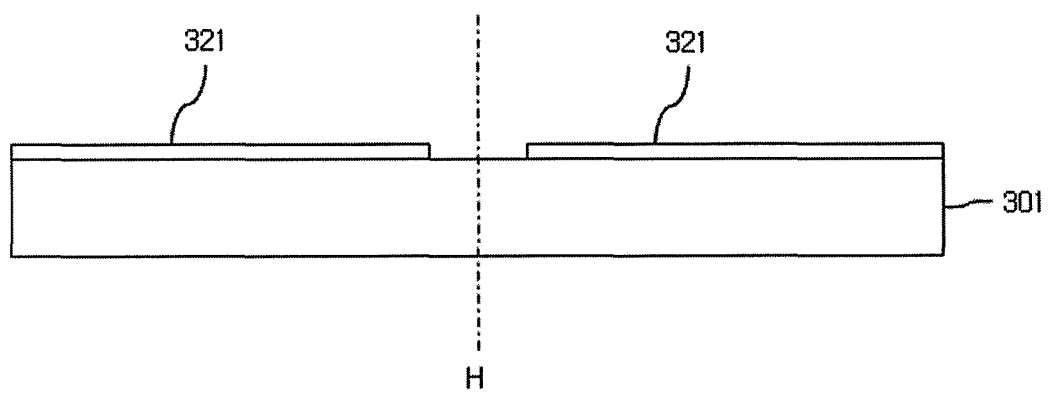
FIGS. 8 to 10 illustrate process perspective views for a method of manufacturing the touch screen panel of FIG. 7.
Figure 9:
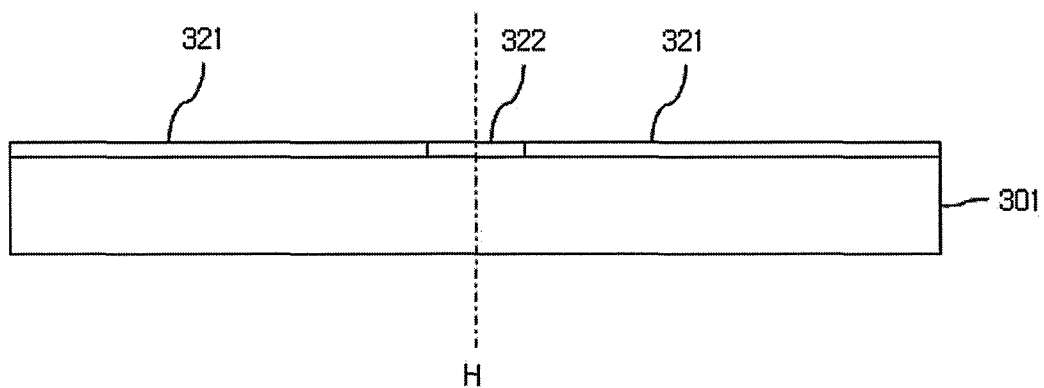
Figure 10:
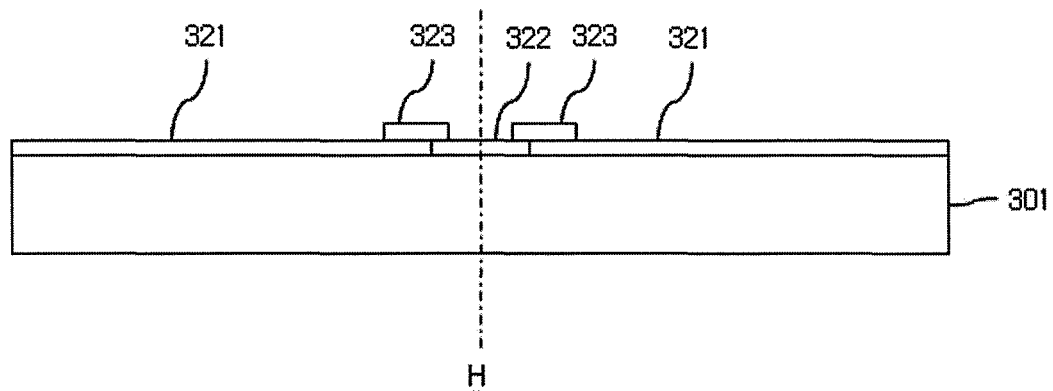

A method of manufacturing the sensing electrode 320 disposed on the folding axis H is described herein with reference to FIGS. 8 to 10. FIGS. 8 to 10 illustrate process perspective views for illustrating a method of manufacturing the touch screen panel of FIG. 7. Referring to FIG. 8, the metal mesh layer 321 is disposed on the transparent substrate 301. The metal mesh layer 321 may be manufactured by the printing manner, the imprinting manner, the lithography manner, or the like. The metal mesh layers 321 of the sensing electrode 320 disposed on the folding axis H and the sensing electrode 320 not disposed on the folding axis H may be formed simultaneously. The metal mesh layer 321 is not formed in a region corresponding to the folding axis H. In the case where the metal mesh layer 321 is formed by the printing manner or the imprinting manner, the pattern formed such that the metal mesh layer 321 is not formed in the region corresponding to the folding axis H may be used. In the case where the metal mesh layer 321 is formed by the lithography manner, the metal mesh layer 321 may not be formed in the region corresponding to the folding axis H by after forming the conductive layer in the region corresponding to the folding axis H, forming the metal mesh layer 321 on the transparent substrate 301, and lifting off the conductive layer. A width of the region corresponding to the folding axis H, that is, the region in which the graphene layer 322 is to be formed, may be determined according to a radius of the folding portion of the panel portion 500. The radius of the folding portion of the panel portion 500 may be about 1 mm to about 3 mm, and the width of the region in which the graphene layer 322 is to be formed may be about 1 mm to about 3 mm or less.

Referring to FIG. 9, the graphene layer 322 is disposed on the transparent substrate 301. The graphene layer 322 is formed in the region corresponding to the folding axis H. The metal mesh layer 321 adheres to the lateral surface of the graphene layer 322. The graphene layer 322 may be formed by a method such as thermal CVD, PE-CVD, and/or MBE.

Referring to FIG. 10, the adhesion metal mesh layer 323 is disposed on the boundary portion between the graphene layer 322 and the metal mesh layer 321. The adhesion metal mesh layer 323 may be manufactured by the printing manner, the imprinting manner, the lithography manner, or the like. The adhesion metal mesh layer 323 may be formed of the same material as the metal mesh layer 321. The adhesion metal mesh layer 323 may be formed to have the minimum width in the degree that contact resistance is reduced and adhesion strength is increased between the graphene layer 322 and the metal mesh layer 321.

Figure 11:
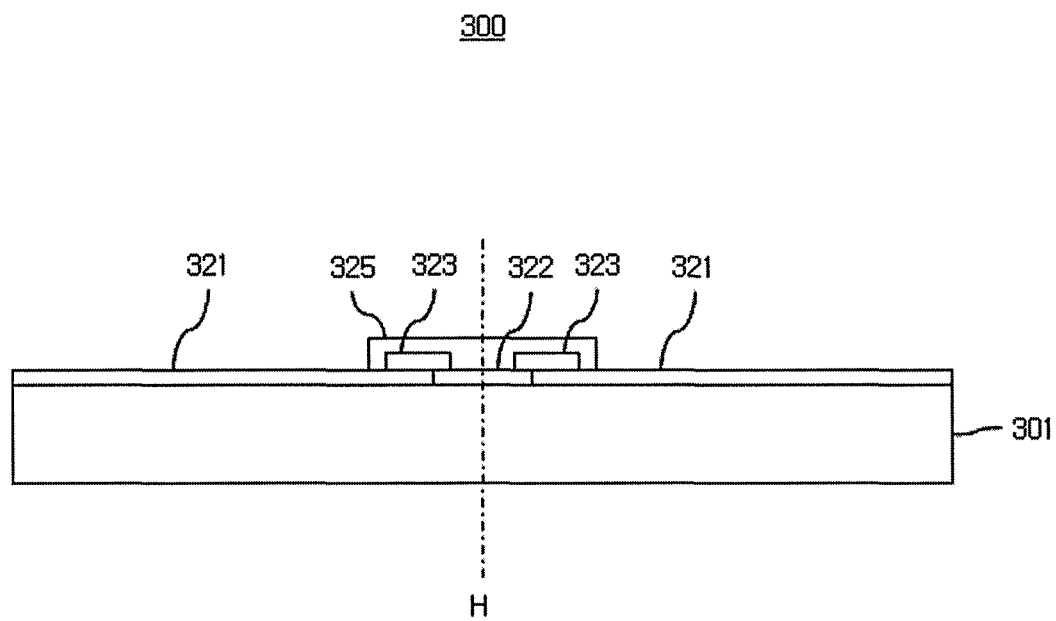
FIG. 11 illustrates a cross-sectional view of a cross-section of a touch electrode in a folding portion of a touch screen panel according to another exemplary embodiment of the present disclosure.

FIG. 11 illustrates a cross-sectional view illustrating a cross-section of a touch electrode in a folding portion of a touch screen panel according to another exemplary embodiment of the present disclosure. As compared to FIG. 7, a touch screen panel 300 may further include a refractive index matching layer 325 on a graphene layer 322 and an adhesion metal mesh layer 323.

A refractive index difference may occur between the graphene layer 322 formed along a folding axis H and a metal mesh layer 321. The refractive index matching layer 325 capable of minimizing the refractive index difference may be on the graphene layer 322 and the adhesion metal mesh layer 323. The refractive index matching layer 325 may surround the graphene layer 322 and the adhesion metal mesh layer 323. $SiO_2$, $ZnO_2$, an AR (antireflection) film coating layer, or the like may be used as the refractive index matching layer 325. The graphene layer 322 may be prevented from being seen due to the refractive index difference by the refractive index matching layer 325.

Figure 12:
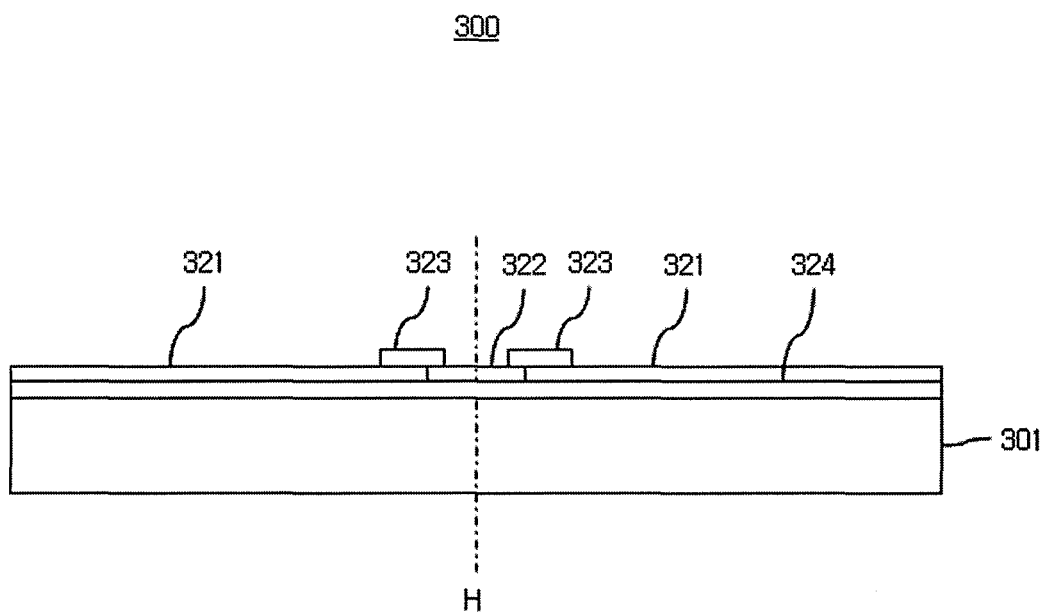
FIG. 12 illustrates a cross-sectional view of a cross-section of a touch electrode in a folding portion of a touch screen panel according to yet another exemplary embodiment of the present disclosure.

FIG. 12 illustrates a cross-sectional view of a cross-section of a touch electrode in a folding portion of a touch screen panel according to yet another exemplary embodiment of the present disclosure. As compared to FIG. 7, a touch screen panel 300 may further include a transparent conductive layer 324 on a transparent substrate 301. The transparent conductive layer 324 may include ITO (indium tin oxide), IZO (indium zinc oxide), ITZO (indium tin zinc oxide), or the like.

The transparent conductive layer 324 may be on the transparent substrate 301, and a metal mesh layer 321 and a graphene layer 322 may be on a transparent conductive layer 324. A sensing electrode 320 on a folding axis H may have high conductivity and high transparency by locating the metal mesh layer 321 and the graphene layer 322 on the transparent conductive layer 324. In the sensing electrode 320 not disposed on the folding axis H, the transparent conductive layer 324 may be on the transparent substrate 301, and the metal mesh layer 321 may be on the transparent conductive layer 324. The sensing electrode 320 not on the folding axis H may have high conductivity and high transparency by locating the metal mesh layer 321 on the transparent conductive layer 324.

Figure 13:
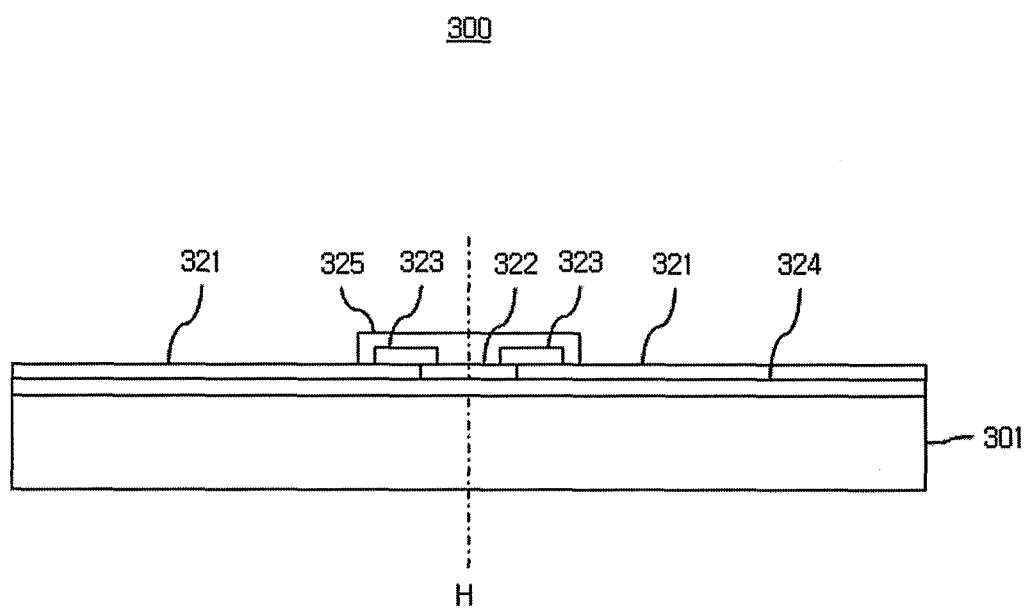
FIG. 13 illustrates a cross-sectional view of a cross-section of a touch electrode in a folding portion of a touch screen panel according to still another exemplary embodiment of the present disclosure.

FIG. 13 illustrates a cross-sectional view of a cross-section of a touch electrode in a folding portion of a touch screen panel according to still another exemplary embodiment. As compared to FIG. 12, a touch screen panel 300 may further include a refractive index matching layer 325 on a graphene layer 322 and an adhesion metal mesh layer 323. The refractive index matching layer 325 may surround the graphene layer 322 and the adhesion metal mesh layer 323. $SiO_2$, $ZnO_2$, an antireflection (AR) film coating layer, or the like may be used as the refractive index matching layer 325. The graphene layer 322 may be prevented from being seen due to a refractive index difference by forming the refractive index matching layer 325.

Figure 14:
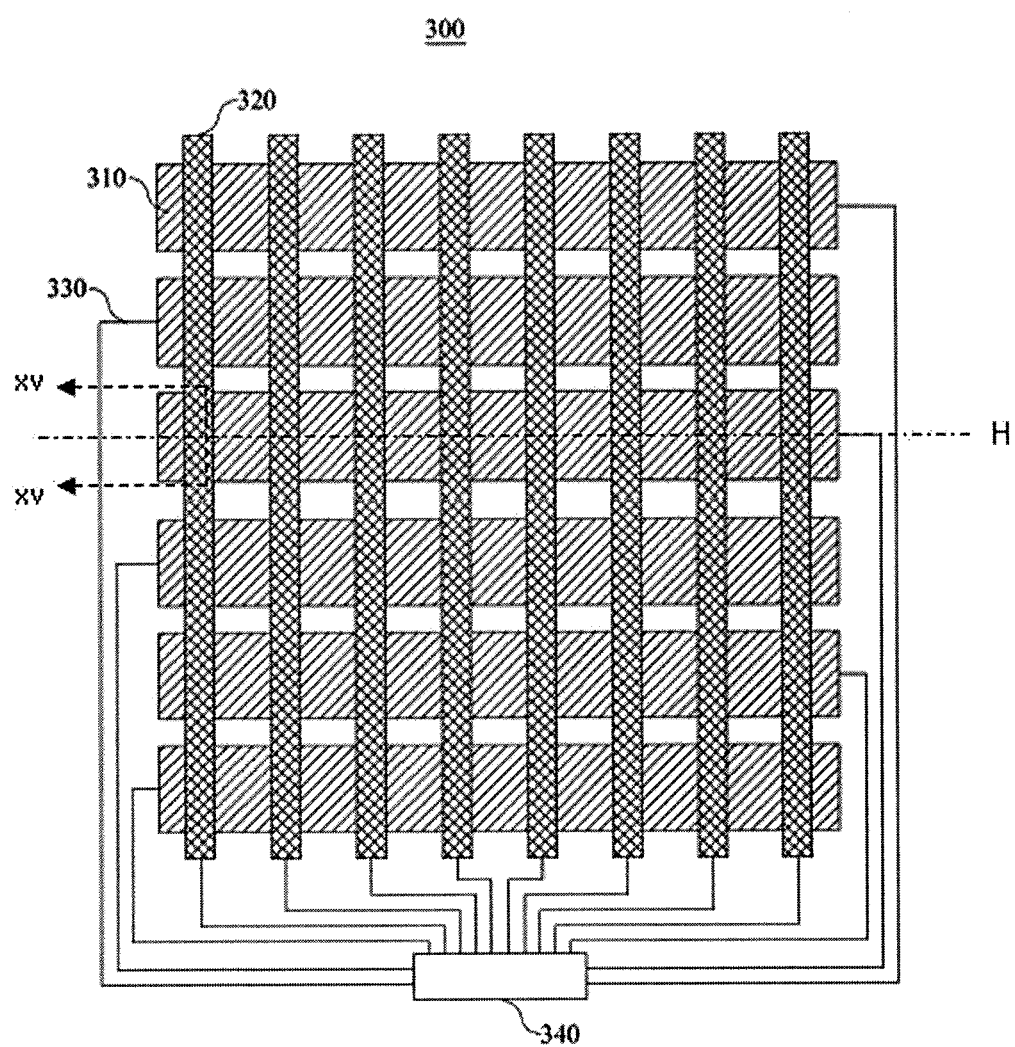
FIG. 14 illustrates a schematic top plan view of the touch screen panel included in a foldable display device according to another exemplary embodiment of the present disclosure.
Figure 15:
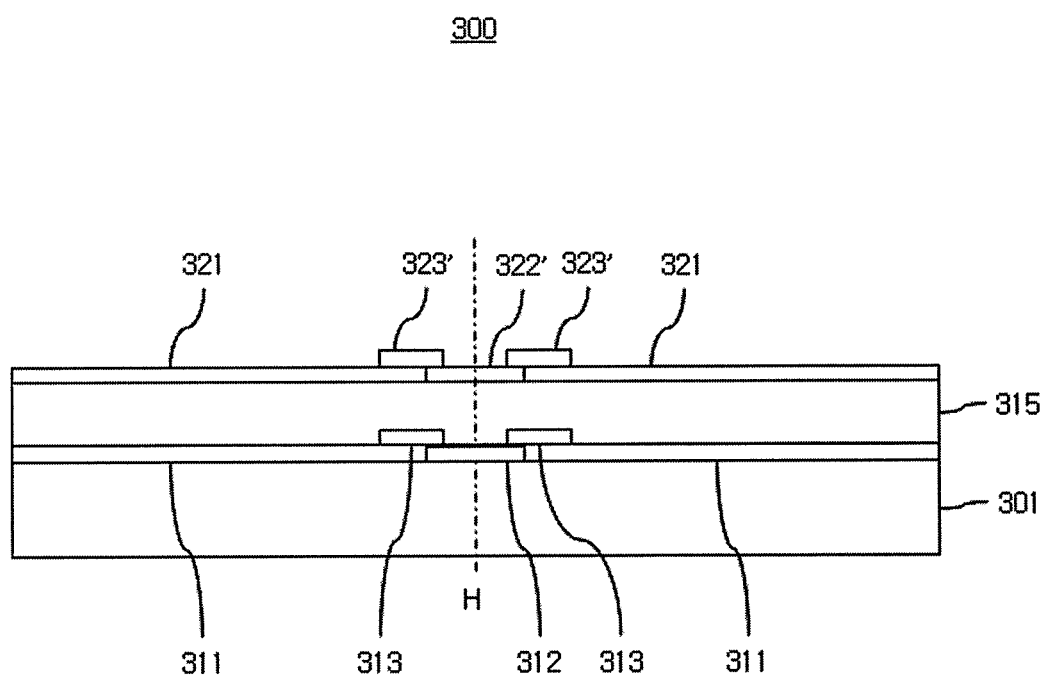
FIG. 15 illustrates a cross-sectional view of a cross-section of a touch electrode, which is taken along line xv-xv, in a folding portion of the touch screen panel of FIG. 14.

FIG. 14 illustrates a schematic top plan view of the touch screen panel included in a foldable display device according to another exemplary embodiment of the present disclosure. FIG. 15 illustrates a cross-sectional view of a cross-section of a touch electrode, which is taken along line xv-xv, in the folding portion of the touch screen panel of FIG. 14. Referring to FIGS. 14 and 15, the touch screen panel 300 is constituted to be the same as a matter described in FIG. 4. However, there is a difference in that the folding axis H is in a first direction that crosses any one of a plurality of driving electrodes 310 and a plurality of sensing electrodes 320. That is, this is the case where the folding portion of the touch screen panel 300 is an overlapping portion of the driving electrode 310 and the sensing electrode 320.

Referring to FIG. 15, a first graphene layer 312 and a first metal mesh layer 311 are on a transparent substrate 301. The first graphene layer 312 is located along the folding axis H. The first metal mesh layer 311 is on the transparent substrate 301 to adhere to a lateral surface of the first graphene layer 312. A first adhesion metal mesh layer 313 is on a boundary portion between the first graphene layer 312 and the first metal mesh layer 311. The first metal mesh layer 311, the first graphene layer 312, and the first adhesion metal mesh layer 313 may constitute the driving electrode 310 on the folding axis H. The driving electrode 310 not on the folding axis H may be constituted by the first metal mesh layer 311.

An insulating layer 315 may be on the first metal mesh layer 311, the first graphene layer 312, and the first adhesion metal mesh layer 313. That is, the insulating layer 315 may be on the driving electrode 310. An inorganic insulating material such as silicon oxide ($SiO_2$) or silicon nitride ($SiN_x$) may be used as the insulating layer 315. Alternatively, as the insulating layer 315, an organic insulating material such as a cellulose derivative, an olefin-based resin, an acryl-based resin, a vinyl chloride-based resin, a styrene-based resin, a polyester-based resin, a polyamide-based resin, a polycarbonate-based resin, a polycycloolefin resin, or an epoxy resin may be used.

A second graphene layer 322' and a second metal mesh layer 321 may be on the insulating layer 315. The second graphene layer 322' may be located along the folding axis H. The second metal mesh layer 321 may be located on the insulating layer 315 to adhere to a lateral surface of the second graphene layer 322'. A second adhesion metal mesh layer 323' may be on a boundary portion between the second graphene layer 322' and the second metal mesh layer 321. The second metal mesh layer 321, the second graphene layer 322', and the second adhesion metal mesh layer 323' may constitute the sensing electrode 320 on the folding axis H. The sensing electrode 320 not on the folding axis H may be constituted by the second metal mesh layer 321.

The first metal mesh layer 311, the first adhesion metal mesh layer 313, the second metal mesh layer 321, and the second adhesion metal mesh layer 323' may be manufactured by a printing manner, an imprinting manner, a lithography manner, or the like. The first metal mesh layer 311, the first adhesion metal mesh layer 313, the second metal mesh layer 321, and the second adhesion metal mesh layer 323' may include a metal material such as copper (Cu), aluminum (Al), molybdenum (Mo), and/or silver (Ag). The first metal mesh layer 311 may include the same material as the first adhesion metal mesh layer 313. The second metal mesh layer 321 may include the same material as the second adhesion metal mesh layer 323'. The first graphene layer 312 and the second graphene layer 322' may be formed by various methods such as thermal CVD, PE-CVD, and/or MBE.

In the foldable display device 100, the folding portion in the driving electrode 310 and at least one sensing electrode 320 on the folding axis H is formed of the graphene layer 322 such that the folding portion has high light transmittance and high electric conductivity and resists cracking and other damage.

Figure 16:
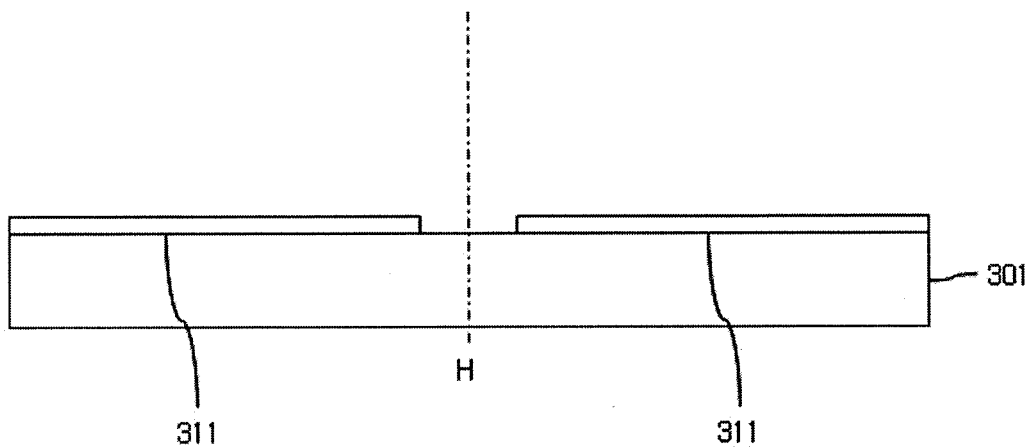
FIGS. 16 to 22 illustrate process perspective views for a method of manufacturing the touch screen panel of FIG. 15.

A method of manufacturing the driving electrode 310 and the sensing electrode 320 on the folding axis H is described with reference to FIGS. 16 to 22. FIGS. 16 to 22 illustrate process perspective views for illustrating a method of manufacturing the touch screen panel of FIG. 15. Referring to FIG. 16, the first metal mesh layer 311 is disposed on the transparent substrate 301. The first metal mesh layer 311 may be manufactured by the printing manner, the imprinting manner, the lithography manner, or the like. The first metal mesh layers 311 of the driving electrode 310 disposed on the folding axis H and the driving electrode 310 not disposed on the folding axis H may be formed simultaneously. The first metal mesh layer 311 may be excluded from a region corresponding to the folding axis H.

Figure 17:
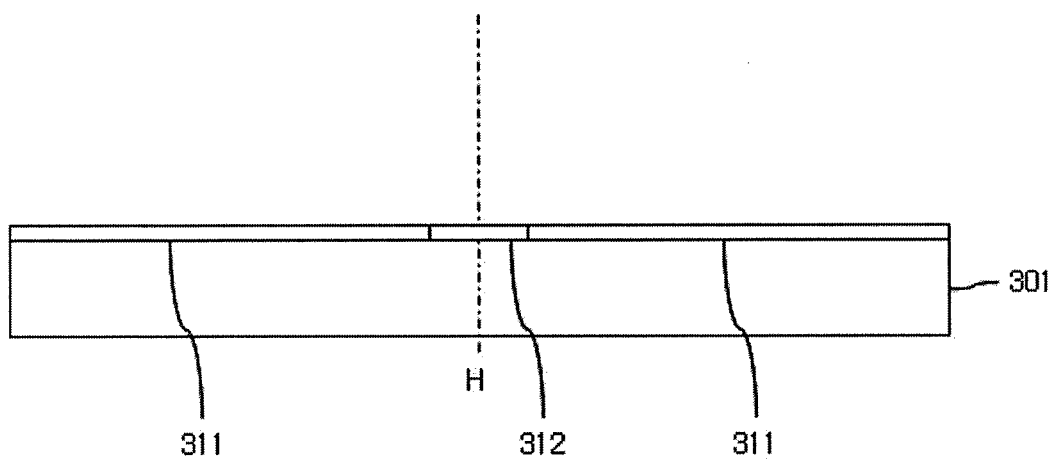

Referring to FIG. 17, the first graphene layer 312 is disposed on the transparent substrate 301. The first graphene layer 312 is disposed in the region corresponding to the folding axis H. The first metal mesh layer 311 adheres to the lateral surface of the first graphene layer 312. A width of the region in which the first graphene layer 312 is formed may be about 1 mm to about 3 mm or less. The first graphene layer 312 may be formed by a method such as thermal CVD, PE-CVD, and/or MBE.

Figure 18:
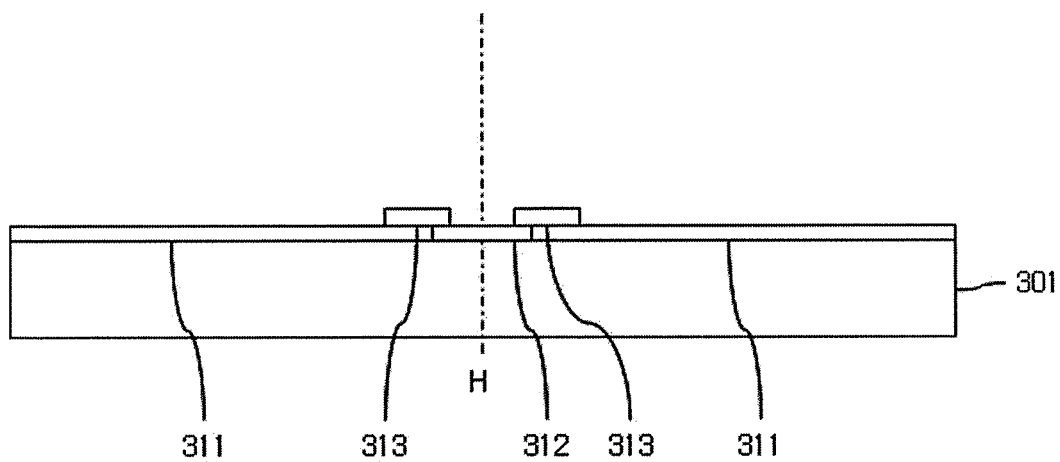

Referring to FIG. 18, the first adhesion metal mesh layer 313 is disposed on the boundary portion between the first graphene layer 312 and the first metal mesh layer 311. The first adhesion metal mesh layer 313 may be manufactured by the printing manner, the imprinting manner, the lithography manner, or the like. The first adhesion metal mesh layer 313 may be formed of the same material as the first metal mesh layer 311. The first adhesion metal mesh layer 313 may be formed to have the minimum width in the degree that contact resistance is reduced and adhesion strength is increased between the first graphene layer 312 and the first metal mesh layer 311.

Figure 19:
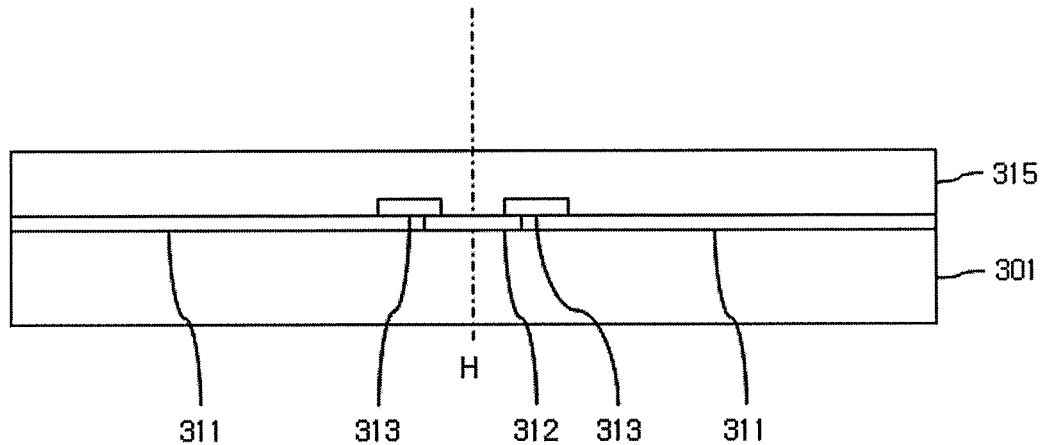
Figure 20:
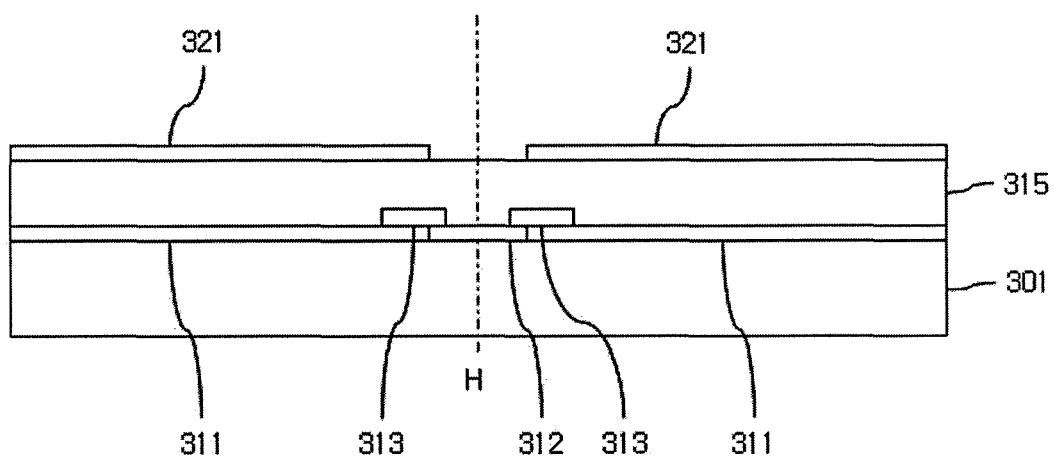

Referring to FIG. 19, the insulating layer 315 is disposed on the first metal mesh layer 311, the first graphene layer 312, and the first adhesion metal mesh layer 313. That is, the insulating layer 315 is disposed on the driving electrode 310. Referring to FIG. 20, the second metal mesh layer 321 is disposed on the insulating layer 315. The second metal mesh layer 321 may be manufactured by the printing manner, the imprinting manner, the lithography manner, or the like. The second metal mesh layers 321 of the sensing electrode 320 disposed on the folding axis H and the sensing electrode 320 not disposed on the folding axis H may be formed simultaneously. The second metal mesh layer 321 may be excluded from the region corresponding to the folding axis H.

Figure 21:
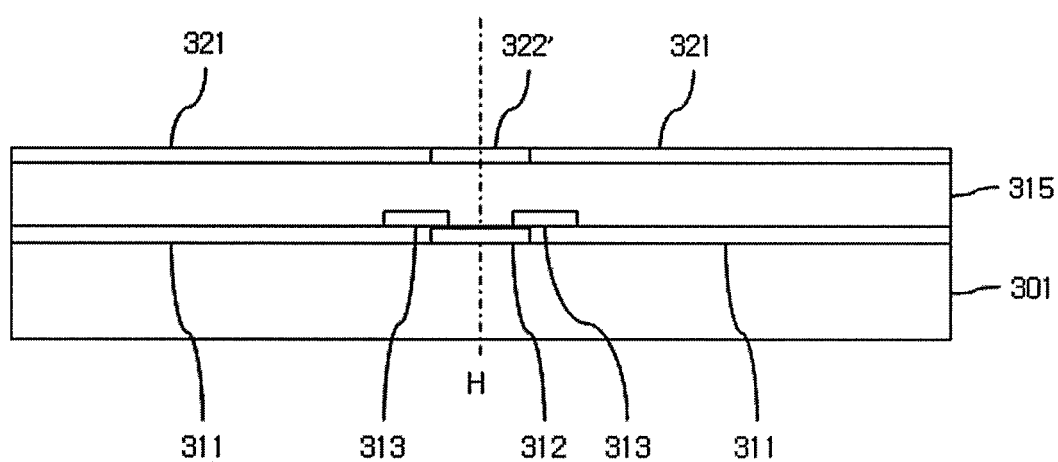

Referring to FIG. 21, the second graphene layer 322' is disposed on the insulating layer 315. The second graphene layer 322' is disposed in the region corresponding to the folding axis H. The second metal mesh layer 321 adheres to the lateral surface of the second graphene layer 322'. The width of the region in which the second graphene layer 322' is formed may be about 1 mm to about 3 mm or less. The second graphene layer 322' may be formed by a method such as thermal CVD, PE-CVD, and/or MBE.

Figure 22:
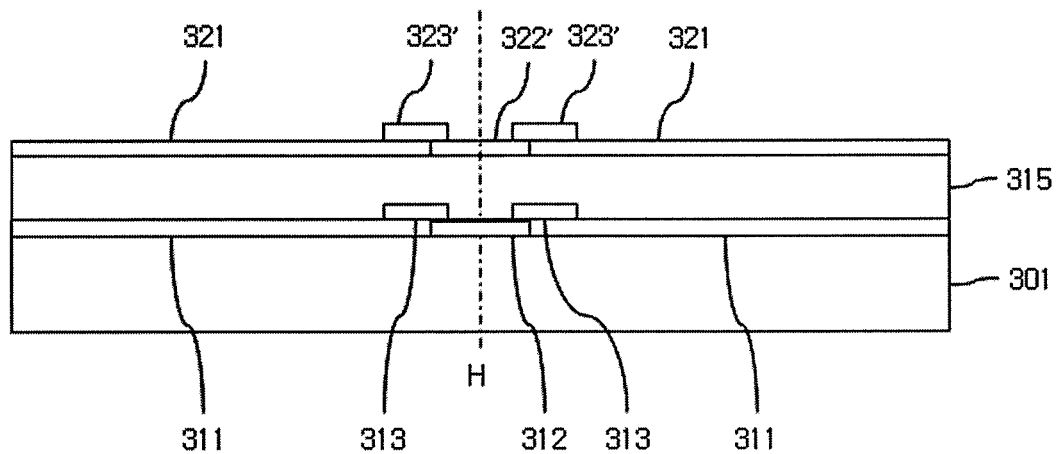

Referring to FIG. 22, the second adhesion metal mesh layer 323' is disposed on the boundary portion between the second graphene layer 322' and the second metal mesh layer 323. The second adhesion metal mesh layer 323' may be manufactured by the printing manner, the imprinting manner, the lithography manner, or the like. The second adhesion metal mesh layer 323' may be formed of the same material as the second metal mesh layer 321. The second adhesion metal mesh layer 323' may be formed to have the minimum width in the degree that contact resistance is reduced and adhesion strength is increased between the second graphene layer 322' and the second metal mesh layer 321.

Figure 23:
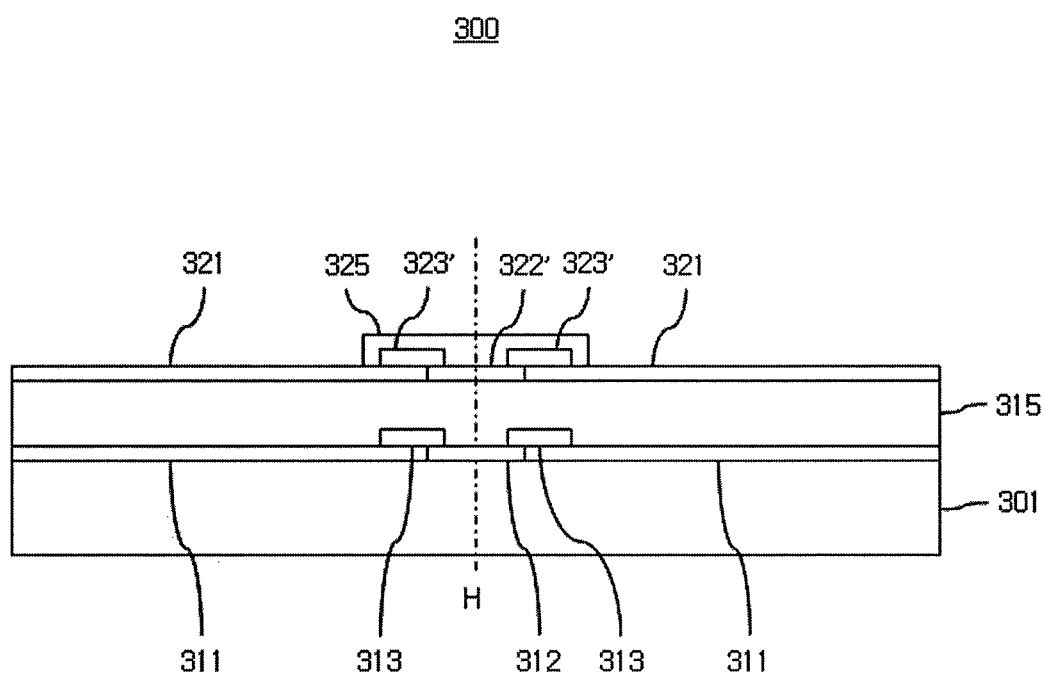
FIG. 23 illustrates a cross-sectional view of a cross-section of a touch electrode in a folding portion of a touch screen panel according to still yet another exemplary embodiment of the present disclosure.

FIG. 23 illustrates a cross-sectional view illustrating a cross-section of a touch electrode in a folding portion of a touch screen panel according to still yet another exemplary embodiment of the present disclosure. As compared to FIG. 22, a touch screen panel 300 may further include a refractive index matching layer 325 disposed on a second graphene layer 322' and a second adhesion metal mesh layer 323'.

A refractive index difference may occur between a first graphene layer 312 formed along a folding axis H and a first metal mesh layer 311, and the refractive index difference may occur between the second graphene layer 322' and a second metal mesh layer 321. The refractive index matching layer 325 capable of minimizing the refractive index difference may be disposed on the second graphene layer 322' and the second adhesion metal mesh layer 323'. The refractive index matching layer 325 may be formed to surround the second graphene layer 322' and the second adhesion metal mesh layer 323'. SiO2, ZnO2, an AR film coating layer, or the like may be used as the refractive index matching layer 325. The first graphene layer 312 and the second graphene layer 322' may be prevented from being seen due to the refractive index difference by forming the refractive index matching layer 325.

By way of summation and review, a touch screen has been applied as an input device of a display device instead of an input device such as a mouse or a keyboard. The touch screen may be applied to the foldable display device. A transparent electrode or a transparent wire made of a material having high light transmittance to visible rays, pure transparency without coloring, high electric conductivity, and an excellent environmental characteristic may be used in the touch screen. A representative example of the material having the aforementioned characteristics includes indium tin oxide (hereinafter, referred to as ITO). However, because ITO has relatively poor flexibility, cracks, and damage may easily occur when it is used in the folding portion of the foldable display device. Thus, ITO is less than ideal for use in the folding portion of a foldable display device, and there exists a need for transparent electrodes and wires with superior flexibility and damage resistance. Hence, the present embodiments have been made to provide a foldable display device that includes a folding portion having high light transmittance and high electric conductivity and strong resistance to cracking and other damage, and a method of manufacturing the same.

Embodiments are directed to the prevention of cracks from being formed in a folding portion during the course of repeatedly folding and unfolding the foldable display device has been conducted. As described herein, a display device and method of manufacturing the same has been developed that helps prevent the formation of such cracks. The folding portion of the foldable display device may have high light transmittance and high electric conductivity and have increased strength and resistance to cracking and the damage. The foldable display device of the present disclosure also has superior bending characteristics.

The above-referenced drawings and the detailed description of the disclosure are only illustrative for the present disclosure, which are used only for the purpose of describing the present disclosure but are not used to restrict the meaning or limit a scope of the present disclosure described in claims. Therefore, it will be understood by those skilled in the art that various modifications and other equivalent exemplary embodiments may be made therefrom. Accordingly, the true technical protection scope of the present disclosure may be defined depending on the technical spirit of the accompanying claims.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims.

What is claimed is:

1. A display device comprising a touch screen panel folded based on a folding axis, wherein the touch screen panel includes at least one first touch electrode on the folding axis, each first touch electrode on the folding axis including:
   a first graphene layer formed along the folding axis in a display area of the display device and on a transparent substrate;
   a first metal mesh layer formed on the transparent substrate; and
   a first adhesion metal mesh layer on a boundary portion between the first graphene layer and the first metal mesh layer,
   wherein a lateral surface of the first metal mesh layer adheres to a lateral surface of the first graphene layer, and the boundary portion of the first graphene layer and the first metal mesh layer is between the first adhesion metal mesh layer and the transparent substrate.

2. The display device as claimed in claim 1, wherein the touch screen panel further includes a plurality of first touch electrodes not on the folding axis, and each of the plurality of first touch electrodes not on the folding axis is part of the first metal mesh layer.

3. The display device as claimed in claim 2, wherein the first metal mesh layer includes one or more of copper (Cu), aluminum (Al), molybdenum (Mo), and silver (Ag).

4. The display device as claimed in claim 3, wherein the first adhesion metal mesh layer includes one or more of copper (Cu), aluminum (Al), molybdenum (Mo), and silver (Ag).

5. The display device as claimed in claim 1, wherein the touch screen panel further includes a refractive index matching layer on the first graphene layer and the first adhesion metal mesh layer.

6. The display device as claimed in claim 1, wherein each touch electrode further includes a transparent conductive layer on the transparent substrate, and the first graphene layer and the first metal mesh layer are on the transparent conductive layer.

7. The display device as claimed in claim 1, wherein the touch screen panel further includes an insulating layer on the first metal mesh layer, the first graphene layer, and the first adhesion metal mesh layer.

8. The display device as claimed in claim 7, wherein the touch screen panel further includes at least one second touch electrode on the folding axis, and each second touch electrode on the folding axis includes a second graphene layer along the folding axis on the insulating layer.

9. The display device as claimed in claim 8, wherein each second touch electrode on the folding axis further includes:
   a second metal mesh layer on the insulating layer adhering to a lateral surface of the second graphene layer; and
   a second adhesion metal mesh layer on a boundary portion between the second graphene layer and the second metal mesh layer.

10. The display device as claimed in claim 9, wherein the touch screen panel further includes a plurality of second touch electrodes not on the folding axis, and each of the plurality of second touch electrodes not on the folding axis is part of the second metal mesh layer.

11. The display device as claimed in claim 10, wherein the second metal mesh layer includes one or more of copper (Cu), aluminum (Al), molybdenum (Mo), and silver (Ag).

12. The display device as claimed in claim 11, wherein the second adhesion metal mesh layer includes one or more of copper (Cu), aluminum (Al), molybdenum (Mo), and silver (Ag).

13. The display device as claimed in claim 9, wherein the touch screen panel further includes a refractive index matching layer on the second graphene layer and the second adhesion metal mesh layer.

14. A method of manufacturing a display device including a touch screen panel folded based on a folding axis, comprising:
   disposing a first metal mesh layer on a transparent substrate;
   disposing a first graphene layer in a region corresponding to the folding axis on the transparent substrate;
   disposing a first adhesion metal mesh layer on a boundary portion between the first graphene layer and the first metal mesh layer such that a lateral surface of the first metal mesh layer is adhered to a lateral surface of the first graphene layer such that the boundary portion of the first graphene layer and the first metal mesh layer is between the first adhesion metal mesh layer and the transparent substrate.

15. The method of manufacturing a display device as claimed in claim 14, wherein the disposing of the first metal mesh layer on the transparent substrate includes:
   disposing the first metal mesh layer included in at least one first touch electrode disposed on the folding axis; and
   disposing a plurality of first touch electrodes not disposed on the folding axis by the first metal mesh layer.

16. The method of manufacturing a display device as claimed in claim 14, further comprising disposing a refractive index matching layer on the first graphene layer and the first adhesion metal mesh layer.

17. The method of manufacturing a display device as claimed in claim 14, further comprising disposing an insulating layer on the first metal mesh layer, the first graphene layer, and the first adhesion metal mesh layer.

18. The method of manufacturing a display device as claimed in claim 17, further comprising disposing a second metal mesh layer on the insulating layer, wherein the disposing of the second metal mesh layer on the insulating layer includes:
   disposing a second graphene layer in a region corresponding to the folding axis on the insulating layer; and
   disposing a second adhesion metal mesh layer on a boundary portion between the second graphene layer and the second metal mesh layer.

19. The method of manufacturing a display device as claimed in claim 18, further comprising disposing a refractive index matching layer on the second graphene layer and the second adhesion metal mesh layer.

20. The method of manufacturing a display device as claimed in claim 18, wherein the disposing of the second metal mesh layer on the insulating layer includes:
   disposing another second metal mesh layer included in at least one second touch electrode disposed on the folding axis; and
   disposing a plurality of second touch electrodes not disposed on the folding axis by the another second metal mesh layer.

* * * * *